United States Patent
Chen et al.

(10) Patent No.: US 10,251,131 B2
(45) Date of Patent: Apr. 2, 2019

(54) INTERACTIVE COMMUNICATION SYSTEM, METHOD AND WEARABLE DEVICE THEREFOR

(71) Applicant: Chiun Mai Communication Systems, Inc., New Taipei (TW)

(72) Inventors: Yi-Cheng Chen, New Taipei (TW); Ming-Chang Liu, New Taipei (TW); Bu-Da Chiou, New Taipei (TW)

(73) Assignee: Chiun Mai Communications Systems, Inc., New Taipei (TW)

( * ) Notice: Subject to any disclaimer, the term of this patent is extended or adjusted under 35 U.S.C. 154(b) by 56 days.

(21) Appl. No.: 15/336,827

(22) Filed: Oct. 28, 2016

(65) Prior Publication Data
US 2017/0289998 A1 Oct. 5, 2017

(30) Foreign Application Priority Data

Mar. 30, 2016 (CN) .......................... 2016 1 0191470

(51) Int. Cl.
| | | |
|---|---|---|
| *G01R 31/08* | (2006.01) | |
| *H04W 52/02* | (2009.01) | |
| *H04L 29/08* | (2006.01) | |
| *H04W 84/18* | (2009.01) | |
| *H04W 88/04* | (2009.01) | |

(52) U.S. Cl.
CPC ......... *H04W 52/0235* (2013.01); *H04L 67/12* (2013.01); *H04W 84/18* (2013.01); *H04W 88/04* (2013.01); *Y02D 70/00* (2018.01); *Y02D 70/142* (2018.01); *Y02D 70/144* (2018.01); *Y02D 70/162* (2018.01); *Y02D 70/26* (2018.01)

(58) Field of Classification Search
CPC . H04L 63/0861; H04L 67/125; H04L 12/282; H04L 29/06; H04L 12/28; H04W 12/06; H04W 4/008
See application file for complete search history.

(56) References Cited

U.S. PATENT DOCUMENTS

| | | |
|---|---|---|
| 2015/0074797 A1 | 3/2015 | Choi et al. |
| 2016/0071391 A1 | 3/2016 | Chang et al. |
| 2016/0241553 A1* | 8/2016 | Kim ................... H04L 63/0861 |

FOREIGN PATENT DOCUMENTS

TW        200917092         4/2009

* cited by examiner

*Primary Examiner* — Hanh N Nguyen
(74) *Attorney, Agent, or Firm* — ScienBiziP, P.C.

(57) ABSTRACT

An interactive communication system includes at least one server, at least one base station for connecting to the server via a network, and at least one wearable device. The at least one wearable device includes a first sensor, a second sensor, a microcontroller, and a wireless communication module. The first sensor is configured for sensing a moving state of the at least one wearable device, and generating a corresponding first sensing signal. The second sensor is configured for sensing whether an object is contacting to or is close to the wearable device, and generating a corresponding second sensing signal. The microcontroller is configured for generating a first controlling signal according to the first sensing signal and the second sensing signal. The wireless communication module is configured for sending the first controlling signal to the least one server via the least one base station.

12 Claims, 3 Drawing Sheets

INTERACTIVE COMMUNICATION SYSTEM, METHOD AND WEARABLE DEVICE THEREFOR

FIELD

The disclosure generally relates to communication systems, and particularly to an interactive communication system, method, and wearable device therefor.

BACKGROUND

Because of advantages such as small volume, convenience of use, wearable devices are widely used for security controls in particular places such as shopping malls, venues, factories and so on. The wearable devices are worn by the people in the particular places and communicate with a server and a control center via base stations so that the control center can obtain information such as positions of the wearable devices timely.

The wearable device commonly uses a conventional input device, such as a microphone, a keyboard, etc. to transmit information to the control center. However, combining the conventional input device into the wearable device lead to a relative higher cost of the wearable device and also makes a volume and a power consumption of the wearable device increase.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
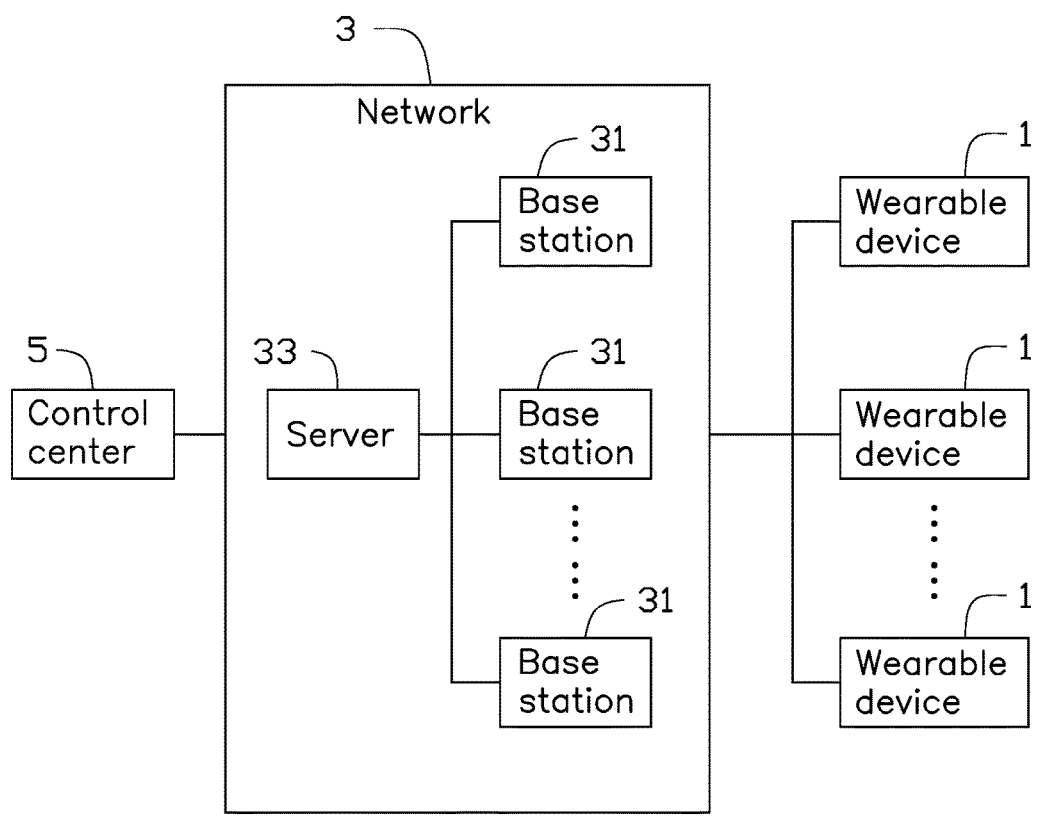
FIG. 1 is a system architecture of one embodiment of an interactive communication system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 shows a system architecture of one embodiment of an interactive communication system. The communication system includes at least one wearable device 1, a network 3, and a control center 5. In one embodiment, the system architecture can be implemented inside a building, e.g. a shopping mall, a factory, a hospital, a hotel, a restaurant, a airport or the like.

The network 3 includes a plurality of base stations 31 and a server 33. Each base station 31 is connected to and communicates with the server 33. The plurality of base stations 31 are located in different selected regions, for serving the wearable devices 1 in different regions. In one embodiment, the plurality of base stations 31 can be BLUETOOTH base stations or access points. The at least one wearable devices 1 can be wearable devices having a BLUETOOTH Low Energy (BLE) sending and receiving function. In this embodiment, the plurality of base stations 31 and the wearable devices 1 can be wirelessly connected via BLUETOOTH protocol. In another embodiment, the plurality of base stations 31 and the wearable devices 1 can be wirelessly connected via other short distance wireless communication protocol. The other short distance wireless communication protocols include, but not limited to, WIFI and ZIGBEE.

Figure 2:
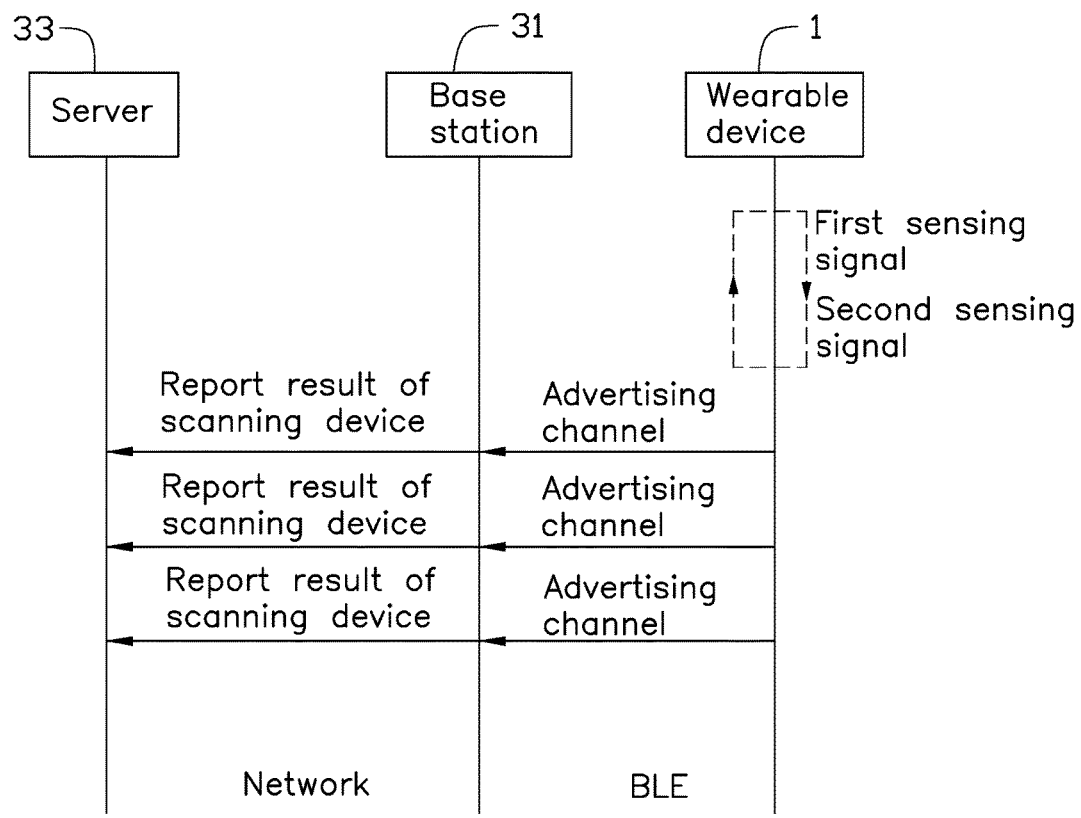
FIG. 2 is a protocol diagram for illustrating a communication method for the communication system of FIG. 1, according to an exemplary embodiment.

FIG. 2 illustrates that, in an exemplary embodiment, the wearable device 1 can transmit information and data to the base station 31 via at least one advertising channel. The transmitted information and data include, but not limited to, an ID code, a signal intensity, or a power supply state of the wearable device 1. The base station 31 receive the information and data, for example, the ID code, the signal intensity, or the power supply state of the wearable device 1. The information and data can be stored in the base station 31 or transmitted to the server 33. In addition, the base station 31 can transmit information or/and command to the wearable device 1.

In other embodiment, the base stations 31 can be electronic devices which have BLUETOOTH communication modules, such as smart phones or tablet PCs. The server 33 pushes the information or/and command to the wearable devices 1 by the base station 31 located in the selected region to inform the information or/and command to a user of the wearable device 1.

The control center 5 includes at least one display configured for display the information and data transmitted by the wearable device 1 and stored by the server 33. The control center 5 further includes an inputting device, which is used to receive the information or/and command (namely the information or/and command pushed by the server as abovementioned) inputted by a system manager. The control center 5 transmits the inputted information or/and command to the server 33, and transmit the inputted information or/and command to all of the wearable devices 1 or selected wearable devices 1 by the server 33.

In this embodiment, the control center 5 can be any electronic devices which can communicate with the server 33. Each control center 5 can be, but not limited to, a wearable device, a handheld device, a personal computer, or a robot. The control center 5 can communicate with the network 3, transmit the information or/and command to the wearable devices 1 via the base stations 31 and server 33 of the network 3 and receive the information or/and data from the wearable device 1 via the base station 31 and server 33 of the network 3.

Figure 3:
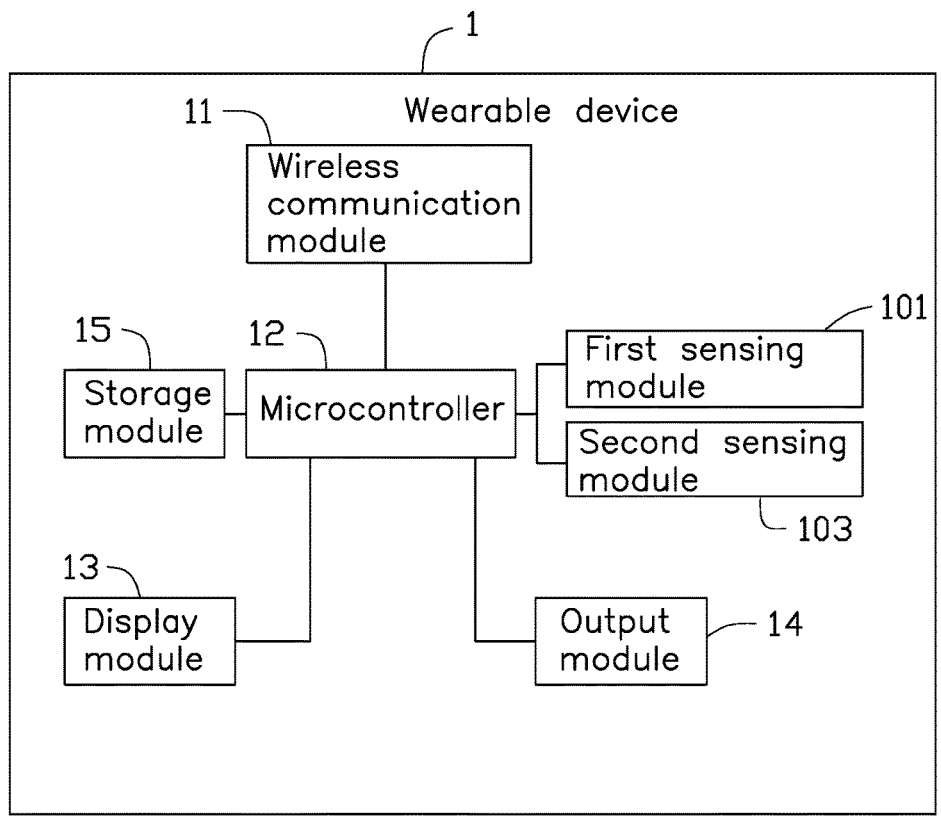
FIG. 3 is a block diagram of one embodiment of an wearable device of the communication system of FIG. 1.

FIG. 3 illustrates, that wearable device 1 can be a wrist strap, a necklace, glasses, a helmet, a wristband, a glove, an arm band, a leg band, or any other object which can be worn by a user. In this exemplary embodiment, the wearable device 1 is a wrist strap can be worn by wrists of an user. The wearable device 1 includes a first sensor 101, a second sensor 103, a wireless communication module 11, a microcontroller 12, and a display module 13. The first sensor 101, a second sensor 102, the wireless communication module 11, and the display module 13 are electronically connected to the microcontroller 12.

In this embodiment, the first sensor 101 is a G-sensor configured for sensing position data of the wearable device 1 at X, Y, and Z axises in a spatial location. The wearable device 1 is worn on the wrist of the user, so that when the wrist of the user moves such as swings, or shakes, the position data of the wearable device 1 at X, Y, and Z axises changes, the first sensor 101 calculates a moving state such as a walking state of the user worn the wearable device 1 by corresponding algorithms, according to the changes of the position data. In this embodiment, the first sensor 101 senses the wearable device 1 rotates from a horizontal placing state to a vertical placing state, and determines whether the wearable device 1 is within an visible range of the user according to the sensed placing state. For example, when the first sensor 101 senses that the wearable device 1 rotates from the horizontal placing state to the vertical placing state, the first sensor 101 determines that the wearable device 1 is within the visible range of the user.

In this embodiment, the second sensor 103 is a proximity sensor, and configured for sensing a specific operation implemented to the wearable device 1 by the user and generates a second sensing signal. In other embodiment, the second sensor 103 is a touch sensor, such as a telecommunications sensor (including resistive type, capacitive type, electromagnetic type, etc.), an optical signal sensor (including infrared type, etc.), and an audio sensor (including surface acoustic wave type, acoustic waveguide type, dispersion signal type, sound pulse type, etc.). In this embodiment, the second sensor 103 senses whether the user is contacting to or is close to the wearable device 1, and senses that the user continuously is contacting to the wearable device 1 in a short time such as two seconds.

The microcontroller 12 identifies a specific action combination according to the first sensing signal and the second sensing signal, and generates a first controlling signal. The wireless communication module 11 transmits the first controlling signal to the server 33 via the base station 31, to response one of the information or/and command received by the wireless communication device module 11 from the server 33 via the base station 31.

In a first exemplary embodiment, when the microcontroller 12 indentifying a first action combination, the microcontroller 12 generates the first controlling signal. For example, when the first sensor 101 senses the wearable device 1 rotates from the horizontal placing state to the vertical placing state, and determines that the wearable device 1 is within the visible range of the user, and the second sensor 103 senses the user is contacting to or is close to the wearable device 1, the microcontroller 12 generates the first controlling signal.

In a second exemplary embodiment, the microcontroller 12 generates the first controlling signal according to a first order that the microcontroller 12 receives the first sensing signal and the second sensing signal. For example, when the microcontroller 12 firstly receives the first sensing signal from the first sensor 101, and then receives the second sensing signal from the second sensor 103, the microcontroller 12 generates the first controlling signal. The first controlling signal can be transmitted to the server 33 via the base station 31, to response one of the information or/and command received by the wireless communication module 11 from the server 33 via the base station 31. In other embodiment, the first controlling signal can be used to control the wearable device 1 to execute a corresponding function.

In a third exemplary embodiment, the microcontroller 12 generates a second controlling signal according to a second order that the microcontroller 12 receives the first sensing signal and the second sensing signal. For example, when the microcontroller 12 firstly receives the second sensing signal from the second sensor 103, and then receives the first sensing signal from the first sensor 101, the microcontroller 12 generates the second controlling signal. The second controlling signal can be transmitted to the server 33 via the base station 31, to response one of the information or/and command received by the wireless communication module 11 from the server 33 via the base station 31. In other embodiment, the second controlling can be used to control the wearable device 1 to execute the corresponding function.

In a fourth exemplary embodiment, the microcontroller 12 identifying a second action combination, according to another group of the first and second sensing signals and generates a third controlling signal to control the wearable device 1 to execute another corresponding function. In this embodiment, when the first sensor 101 senses the wearable device 1 is within the visible range of the user, and the second sensor 103 senses that the user is continuously contacting to the wearable device 1 in a short time such as two seconds, the microcontroller 12 controls the wearable device 1 to switch between different displaying information.

In a fifth exemplary embodiment, the microcontroller 12 generates a fourth controlling signal, according to a state of the wearable device 1, the first sensing signal, and the second sensing signal to control the wearable device 1 to execute the corresponding function. In this embodiment, the state is defined as a state of a screen of the wearable device, wherein when the screen is powered off, the corresponding function is powering on the screen, and when the screen is powered on, the corresponding function is powering off the screen.

In this embodiment, when the microcontroller 12 determines the screen of the wearable device 1 is powered off, and identifies a third action combination, according to a group of first sensing signal, the microcontroller 12 generates the fourth controlling signal. For example, the first sensor 101 senses that the wearable device 1 is within the visible range of the user, the microcontroller 12 generates the fourth controlling signal to power on the screen of the wearable device 1. When microcontroller 12 determines the screen of the wearable device 1 is powered on, and identifies a fourth action combination, according to the group of first sensing signal, the microcontroller 12 generates the fourth controlling signal. For example, the first sensor 101 senses the wearable device 1 is without the visible range of the user for a period of time, the microcontroller 12 generates the fourth controlling signal to power off the screen of the wearable device.

In this embodiment, the wireless communication module 11 is a BLE transceiver. The wireless communication module 11 is electronically connected to the microcontroller 12, and includes an antenna (not shown) configured for sending the information or/and commands to the base stations 31, and also receiving the information or/and commands from the base stations 31, and sending the received information or/and commands to the microcontroller 12. The wireless communication module 11 also sends the first controlling signal to the base station 31, and sends to the control center 5 via the base station 31 and server 33 so that the system manager can timely obtain the state of the user worn the wearable device 1.

The microcontroller 12 receives the information or/and command from the base station 31 and controls the display module 13 to display a corresponding information for the user according to the information or/and command.

In other embodiment, the wearable device 1 can further include an output module 14. The output module 14 is electronically connected to the microcontroller 12. In this embodiment, the output module 14 can be a speaker or an indicator, configured for playing corresponding audio or emitting corresponding light to the user according to the command or/and information. In addition, the wearable device 1 can further include a storage module 15, configured for storing or temporarily storing the received information or/and command and the first sensing signal and the second sensing signal.

The wearable device 1 uses the first sensor 101 and the second sensor 103 to control the microcontroller 12 to execute the corresponding function, replacing a conventional input device such as a microphone, or a keyboard so that the wearable device 1 can have a low cost, and a small volume and power consumption.

It is to be understood, however, that even through numerous characteristics and advantages of the present disclosure have been set fourth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An interactive communication system comprising;
    at least one server;
    at least one base station for connecting to the server via an network; and
    at least one wearable device, the at least one wearable device comprising:
        a first sensor, configured for sensing a moving state of the at least one wearable device, and generating a corresponding first sensing signal;
        a second sensor, configured for sensing whether a user is contacting to or is close to the wearable device, and generating a corresponding second sensing signal;
        a microcontroller, the microcontroller electronically connected to the first sensor and the second sensor, configured for generating a first controlling signal when the microcontroller firstly receives the first sensing signal from the first sensor and then receives the second sensing signal from the second sensor or generating a second controlling signal when the microcontroller firstly receives the second sensing signal from the second sensor and then receives the first sensing signal from the first sensor; and
        a wireless communication module, the wireless communication module electronically connected to the microcontroller, configured for wirelessly connecting to the at least one base station, and sending the first controlling signal to the at least one server via the at least one base station.

2. The interactive communication system of claim 1, wherein the microcontroller generates a third controlling signal according to a state of the wearable device, the first sensing signal and the second sensing signal to control the at least one wearable device to execute corresponding functions, the state is a screen state of the wearable device, when the screen of the wearable device is powered off, the corresponding function is powering on the screen, and when the screen of the wearable device is powered on, the corresponding function is powering off the screen.

3. The interactive communication system of claim 1, wherein when the microcontroller determines a screen of the wearable device is powered off and the first sensor senses that the wearable device is within a visible range of the user, the microcontroller powers on the screen of the wearable device; when the microcontroller determines the screen of the wearable device is powered on and the first sensor senses that the wearable device is without the visible range of the user for a period of time, the microcontroller powers off the screen of the wearable device.

4. The interactive communication system of claim 1, wherein the wireless communication module is further configured for receiving information or/and command from the at least one server via the at least one base station, wherein the first controlling signal is configured for responding the information or/and command.

5. A communication method for a communication system, the communication system comprising at least one wearable device, at least one server, and at least one base station for serving the at least one wearable device, the method comprising:
    sensing a moving state of the at least one wearable device, and generating a first sensing signal, and sensing whether a user is contacting to or is close to the wearable device, and generating a second sensing signal;
    generating a first controlling signal when a microcontroller of the wearable device firstly receives the first sensing signal from the first sensor and then receives the second sensing signal from the second sensor;
    generating a second controlling signal when the microcontroller firstly receives the second sensing signal from the second sensor and then receives the first sensing signal from the first sensor; and
    sending the first controlling signal to the at least one server via the at least one base station.

6. The communication method of claim 5, further comprising generating a third controlling signal according to a state of the wearable device, the first sensing signal and the second sensing signal to control the wearable device to execute corresponding functions, wherein the stoic is a screen state of the wearable device, when the screen of the wearable device is powered off, the corresponding function is powering on the screen, and when the screen of the wearable device is powered on, the corresponding function is powering off the screen.

7. The communication method of claim 5, wherein when the microcontroller determines a screen of the wearable device is powered off and the first sensor senses that the wearable device is within a visible range of the user, the microcontroller powers on the screen of the wearable device; when the microcontroller determines the screen of the wearable device is powered on and the first sensor senses that the wearable device is without the visible range of the user for a period of time, the microcontroller powers off the screen of the wearable device.

8. The communication method of claim 5, further comprising receiving information or/and command from the at least one server via the at least one base station, wherein the first controlling signal is configured for responding the information or/and command.

9. A wearable device comprising:
- a first sensor, configured for sensing a moving state of the at least one wearable device, and generating a first sensing signal;
- a second sensor, configured fir sensing whether a user is contacting to or is close to the wearable device, and generating a second sensing signal;
- a microcontroller, the microcontroller electronically connected to the first sensor and the second sensor, configured for generating a first controlling signal when the microcontroller firstly receives the first sensing signal from the first sensor and then receives the second sensing signal from the second sensor or generating a second controlling signal when the microcontroller firstly receives the second sensing signal from the second sensor and then receives the first sensing signal from the first sensor; and
- a wireless communication module, the wireless communication module electronically connected to the microcontroller, configured for wirelessly connecting to the at least one base station, and sending the first controlling signal to the at least one server via the at least one base station.

10. The wearable device of claim 9, wherein the microcontroller generates a third controlling signal according to a state of the wearable device, the first sensing signal and the second sensing signal to control the wearable device to execute corresponding functions, the state is a screen state of the wearable device, when the screen of the wearable device is powered off, the corresponding function is powering on the screen, and when the screen of the wearable device is powered on, the corresponding function is powering off the screen.

11. The wearable device of claim 9, wherein when the microcontroller determines a screen of the wearable device is powered off and the first sensor senses that the wearable device is within a visible range of the user, the microcontroller powers on the screen of the wearable device; when the microcontroller determines the screen of the wearable device is powered on and the first sensor senses that the wearable device is without the visible range of the user for a period of time, the microcontroller powers off the screen of the wearable device.

12. The wearable device of claim 9, wherein the wireless communication module is further configured for receiving information or/and command from the at least one server via the at least one base station, wherein the first controlling signal is configured for responding the information or/and command.

* * * * *